(12) United States Patent
Fromme et al.

(10) Patent No.: US 6,334,796 B1
(45) Date of Patent: Jan. 1, 2002

(54) ASSEMBLY HAVING AN ELECTRICAL MACHINE AND A POWER ELECTRONICS UNIT

(75) Inventors: Georg Fromme, Seevetal; Hans-Georg Mittmann, Wentdorf; Torsten Leifert, Vögelsen; Martin Hinkelmann, Escheburg, all of (DE)

(73) Assignee: Still GmbH (DE)

( * ) Notice: Subject to any disclaimer, the term of this patent is extended or adjusted under 35 U.S.C. 154(b) by 0 days.

(21) Appl. No.: 09/351,960

(22) Filed: Jul. 12, 1999

(30) Foreign Application Priority Data

Jul. 15, 1998 (DE) .......................................... 198 31 829

(51) Int. Cl.⁷ ............................................. H01R 13/24
(52) U.S. Cl. ..................................................... 439/700
(58) Field of Search ................................ 439/700, 824, 439/271, 559, 289, 281, 34, 310, 348, 35; 180/65.1

(56) References Cited

U.S. PATENT DOCUMENTS 4,582,374 A * 4/1986 Conrad et al. ........... 339/17 M
5,366,384 A * 11/1994 Dolce et al. ................. 439/372
5,649,833 A * 7/1997 Pfeuffer et al. ............. 439/218

FOREIGN PATENT DOCUMENTS

| DE | 9402335 | 5/1994 |
| DE | 4446243 | 3/1996 |
| DE | 1963497 | 3/1998 |

* cited by examiner

Primary Examiner—Gary Paumen
Assistant Examiner—P Nguyen
(74) Attorney, Agent, or Firm—Webb Ziesenheim Logsdon Orkin & Hanson, P.C.

(57) ABSTRACT

An assembly having an electrical machine and a power electronics unit for use in a vehicle includes a housing part of the electrical machine connectable with a housing part of the power electronics unit at a seam between the two parts. Electrical pressure contacts are located in the vicinity of the seam between the two parts. Each pressure contact has one contact point located on the power electronics unit and one contact point located on the electrical machine. At least one contact point of a pressure contact is spring-loaded toward the other contact point of the same pressure contact.

15 Claims, 2 Drawing Sheets

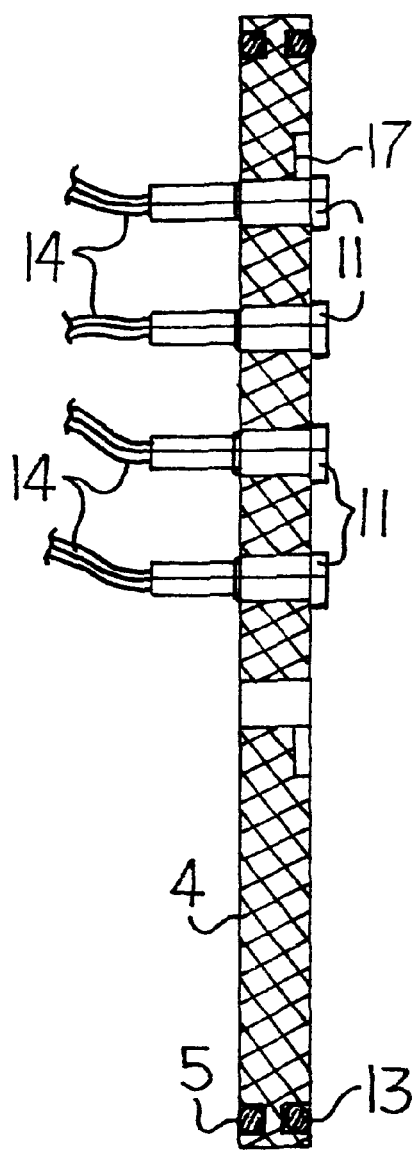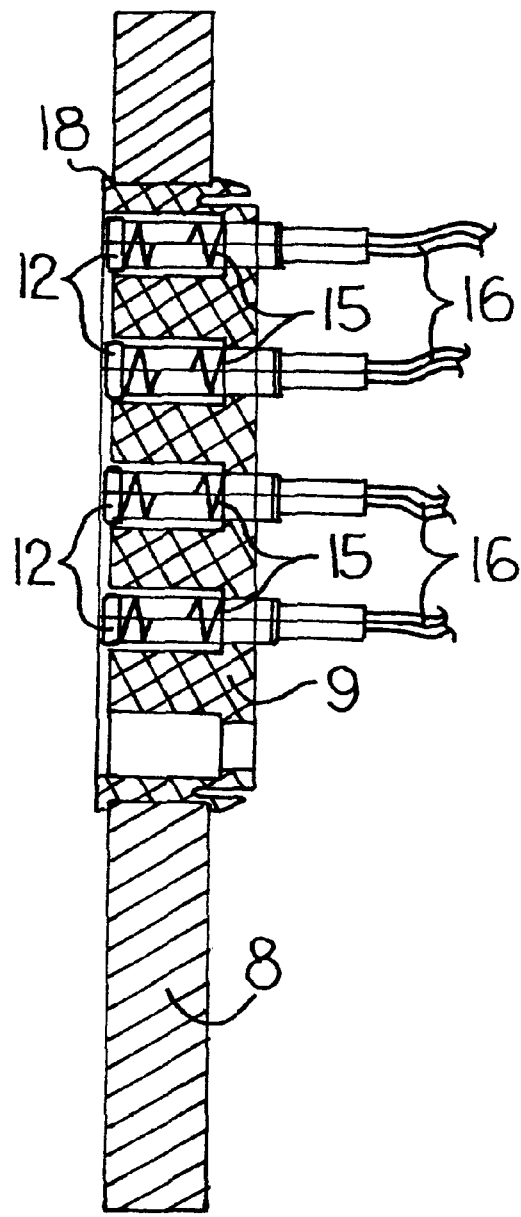

ASSEMBLY HAVING AN ELECTRICAL MACHINE AND A POWER ELECTRONICS UNIT

BACKGROUND OF THE INVENTION

1. Field of the Invention

This invention relates generally to an assembly having an electrical machine and a power electronics unit for use in a vehicle.

2. Description of the Prior Art

Assemblies of this type are used in electrically powered vehicles, such as industrial trucks, for example. The power electronics unit is frequently a converter. The electrical machine can be, for example, the propulsion motor of the vehicle. In that case, the propulsion motor is supplied with electrical energy by means of the power electronics unit. In an additional application, for example on a vehicle that uses diesel-electric propulsion, the electrical machine can be a generator, whereby the electrical energy generated by the generator is supplied to the power electronics unit.

On similar assemblies of the prior art, the electrical machine and the power electronics unit are located separately from one another. Frequently, the housing for the electrical machine and the housing for the power electronics unit are fastened separately from each other to the frame of the vehicle. An electrical connection between the electrical machine and the power electronics unit is generally created using cables and screwed electrical connections. The type of cable and screwed connections used are determined by the intensity of the current to be transmitted as well as by the stresses that are likely to be encountered. Because the screwed electrical connections must be protected from external influences such as dirt or moisture, the screwed connections on similar assemblies of the prior art are typically provided with an additional cover.

The manufacture and service of prior art assemblies are time-consuming and material-intensive processes. Therefore, it is an object of this invention to provide an assembly that is easy to manufacture having an electrical machine and a power electronics unit which can be used in a vehicle.

SUMMARY OF THE INVENTION

The invention teaches that a housing part of the electrical machine is connected with a housing part of the power electronics unit at a seam between the two parts, and electrical pressure contacts are located in the vicinity of the seam between the two parts. The seam between the two parts is preferably substantially flat. The power electronics unit preferably is fastened directly to the electrical machine, for example by means of threaded fasteners, as a result of which the seam between the two parts can be substantially flat.

The pressure contacts located in the vicinity of the seam between the two parts are automatically connected to the electrical machine during the installation of the power electronics unit. In this case, each pressure contact has one contact face or point located on the power electronics unit and one contact face or point on the electrical machine. To promote secure electrical contact and to compensate for potential manufacturing tolerances, at least one contact point of a pressure contact is spring-loaded toward the other contact point of the same pressure contact.

It is appropriate that at least one seal is located in the vicinity of the seam between the two parts. The seal is located between the housing parts of the power electronics unit and the electrical machine, and protects the pressure contacts against external influences such as dust and moisture. If there are means to center the contact points in the vicinity of the seam between the two parts, this ensures that the power electronics unit and the electrical machine can be operationally connected to one another only in the correct position. Thus, the creation of unintentional electrical connections or short circuits is practically impossible. At least some of the electrical pressure contacts are provided to electrically connect the power electronics unit with the electrical machine. Thus, no cable connections located outside the housing are necessary between the electrical machine and the power electronics unit.

In one advantageous embodiment of the invention, at least some of the electrical pressure contacts are provided for the electrical connection of the power electronics unit and additional electrical assemblies or units of the vehicle, whereby lines to these assemblies or units may be laid through the housing part of the electrical machine. The additional electrical assemblies in question can include, for example, a braking resistance or a power supply unit. In this manner, all of the electrical connections of the power electronics unit can be in the form of pressure contacts, in which case it becomes possible to eliminate exposed lines.

In summary, the following advantages are achieved by electrical connections in the form of pressure contacts according to the invention:

Errors caused by incorrect assembly, such as mixups in the connections or insufficient tightening of the screwed connections used previously, become impossible.

Assembly and installation time is significantly reduced, because the connection of the contacts is completed with the installation of the power electronics unit.

Electrical components can be replaced quickly and correctly, even under difficult conditions, such as during service at the site where the vehicle is being operated.

Apart from the seal of the seam between the two parts, no special measures are required to provide protection against outside influences.

BRIEF DESCRIPTION OF THE DRAWINGS

Additional advantages and details of the invention are explained in greater detail below with reference to the exemplary embodiment that is illustrated in the accompanying drawings, in which:

FIG. 2 is a sectional view of the housing part of the electrical machine; and FIG. 3 is a sectional view of the housing part of the power electronics unit.

DESCRIPTION OF A PREFERRED EMBODIMENT OF THE INVENTION

Figure 1:
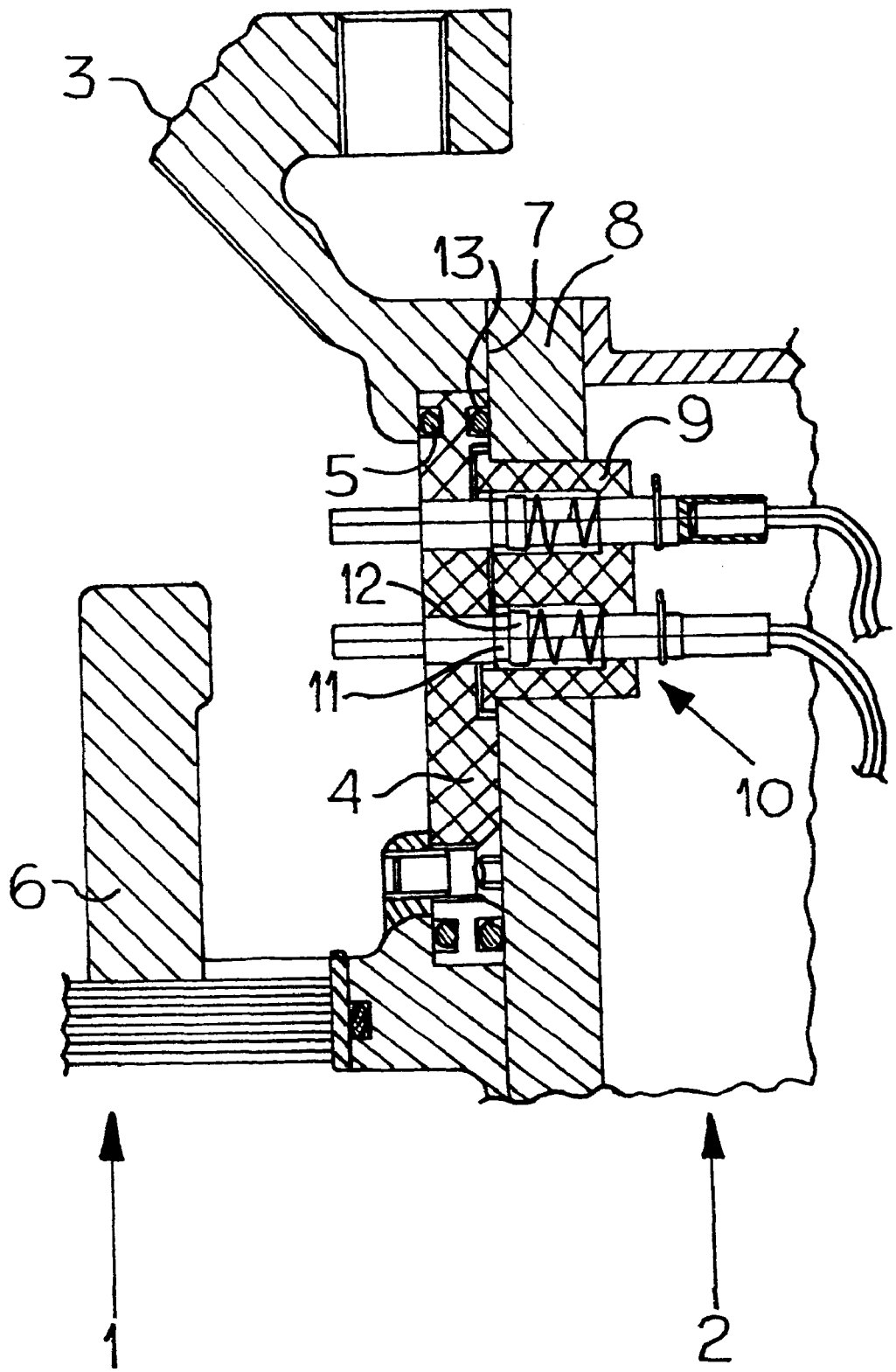
FIG. 1 is a partial sectional schematic view showing the assembled electrical machine and the power electronics unit with pressure contacts.

FIG. 1 shows a partial sectional schematic view of an electrical machine 1 and a power electronics unit 2. In a metal housing 3 of the electrical machine, a plastic connection plate is inserted as a housing part 4 and is sealed with respect to the metal housing 3 by means of a seal 5. FIG. 1 also shows a portion of a stator winding 6 of the electrical machine 1. In this exemplary embodiment, and not to be considered as limiting to the invention, the electrical machine 1 is in the form of a motor, preferably in the form of a three-phase AC motor.

A substantially flat seam 7 between the two parts separates the housing 3 and housing part 4 of the electrical machine 1 from housing parts 8 and 9 of the power electronics unit 2, which in the exemplary embodiment illustrated is in the form of a converter. In this case, the housing part 8 of the power electronics unit is formed by an aluminum plate and the housing part 9 is formed by an insulating connecting plate. An encircling seal 13 protects the electrical elements located in the vicinity of the seam 7 between the two parts from external influences.

The invention teaches that the housing parts 4 and 9 of the power electronics unit 2 have electrical pressure contacts 10 in the vicinity of the seam 7 between the two parts. The pressure contacts 10 are automatically closed when the housing parts 4 and 9 are assembled, during which process contact surfaces or points 11 and 12 are pushed together.

The structure of the pressure contacts 10 is illustrated in FIGS. 2 and 3, in which FIG. 2 shows the housing part 4 of the electrical machine and FIG. 3 shows the housing parts 8 and 9 of the power electronics unit. The contact surfaces or points 11 on the electrical machine 1 are rigidly fastened to the housing part 4 and are connected by means of a cable 14 with the corresponding connections of the electrical machine 1 or with other units located outside the electrical machine 1.

Located in the housing part 9 of the power electronics unit 2 are the contact surfaces or points 12, which are pressed or biased by means of compression springs 15 outwardly from the power electronics unit housing, e.g., toward the contact points 11 of the electrical machine 1. The compression springs 15 ensure a sufficient pressure force at all times between the contact points 11 and 12 when the electrical machine 1 and power electronics unit 2 are connected. Electrical cables 16 connect the contact points 12 with the corresponding connections of the power electronics unit 2. Although in the preferred embodiment the contact points 12 are biased outwardly, it is to be understood that the contact points 11 of the electrical machine 1 could alternatively, or additionally, be biased in similar manner.

The housing part 4 of the electrical machine 1 has an encircling recess 17 that corresponds to an encircling elevated area 18 of the housing part 8 of the power electronics unit 2. By means of these elements, the housing parts 4 and 8 may be centered or aligned with one another in the correct position, so that improper contact between the contact points 11 and 12 can be prevented.

Having described a presently preferred embodiment of the invention, it is to be understood that the invention may otherwise be embodied within the scope of the appended claims.

We claim:

1. An industrial truck having an electrical connection assembly comprising:

an electrical machine having a housing with a housing part, wherein the electrical machine is selected from the group consisting of a propulsion motor and a generator;

a power electronics unit having a housing with a housing part; and at least one electrical pressure contact having a first contact point and a second contact point, wherein said first contact point is carried on said electrical machine housing part and said second contact point is carried on said power electronics unit housing part such that said first contact point contacts said second contact point when said housing parts abut.

2. An industrial truck, comprising:

an electrical machine having a housing with a housing part, wherein the electrical machine is selected from the group consisting of a propulsion motor and a generator;

a power electronics unit having a housing with a housing part, wherein the power electronics unit comprises a converter; and at least one electrical pressure contact having a first contact point and a second contact point, wherein said first contact point is carried on said electrical machine housing part and said second contact point is carried on said power electronics unit housing part such that said first contact point contacts said second contact point when said housing parts abut.

3. A vehicle as claimed in claim 2, wherein the electrical machine is selected from a propulsion motor and a generator.

4. A vehicle as claimed in claim 2, wherein the power electronics unit comprises a converter.

5. An industrial truck, comprising:

a vehicle assembly having an electrical machine and a power electronics unit, said vehicle assembly comprising:

a housing part of the electrical machine connectable with a housing part of the power electronics unit at a seam between the two housing parts, with at least one electrical pressure contact being located in the vicinity of the seam between the two parts, wherein the electrical machine is selected from a propulsion motor and a generator.

6. The assembly as claimed in claim 5, wherein at least some of the electrical pressure contacts are provided for the electrical connection of the power electronics unit and the electrical machine.

7. The assembly as claimed in claim 5, wherein at least some of the electrical pressure contacts are provided for the electrical connection of the power electronics unit with additional electrical units of the vehicle, whereby lines to these additional units are laid through the housing part of the electrical machine.

8. The assembly as claimed in claim 5, wherein at least one seal is located in the vicinity of the seam between the two parts.

9. The assembly as claimed in claim 8, including means for centering the contact points located in the vicinity of the seam between the two parts.

10. The assembly as claimed in claim 5, wherein each pressure contact has at least one contact point located on the power electronics unit and at least one contact point located on the electrical machine.

11. The assembly as claimed in claim 10, wherein at least one seal is located in the vicinity of the seam between the two parts.

12. The assembly as claimed in claim 10, including means for centering the contact points located in the vicinity of the seam between the two parts.

13. The assembly as claimed in claim 10, wherein at least one contact point of the pressure contact is springloaded toward the other contact point of the same pressure contact.

14. The assembly as claimed in claim 13, wherein at least one seal is located in the vicinity of the seam between the two parts.

15. The assembly as claimed in claim 13, including means for centering the contact points located in the vicinity of the seam between the two parts.

* * * * *

UNITED STATES PATENT AND TRADEMARK OFFICE
CERTIFICATE OF CORRECTION

PATENT NO.   : 6,334,796 B1  
DATED        : January 1, 2002  
INVENTOR(S)  : Georg Fromme et al.

Page 1 of 1

It is certified that error appears in the above-identified patent and that said Letters Patent is hereby corrected as shown below:

Title page,  
Item [56] References Cited, insert: -- OTHER PUBLICATIONS  
VDI/AWF 2361 Disclosure, August 1969 --.

Column 4,  
Lines 60-65, delete claims 14 and 15.

Signed and Sealed this

Twenty-eighth Day of May, 2002

Attest:

*Attesting Officer*

JAMES E. ROGAN  
*Director of the United States Patent and Trademark Office*